United States Patent [19]

Decker

[11] Patent Number: 5,107,743
[45] Date of Patent: Apr. 28, 1992

[54] PIANO TEACHING DEVICE AND METHOD

[76] Inventor: Tom W. Decker, 1509 Government St., Suite 409, Mobile, Ala. 36604

[21] Appl. No.: 444,968

[22] Filed: Dec. 4, 1989

[51] Int. Cl.⁵ ............................................. G09B 15/08
[52] U.S. Cl. ...................................... 84/478; 84/479 A
[58] Field of Search ...................... 84/470 R, 477, 478, 84/479

[56] References Cited

U.S. PATENT DOCUMENTS

| | | | |
|---|---|---|---|
| 529,928 | 11/1894 | Lyle | 84/481 |
| 3,377,716 | 4/1968 | Schmoyer | 84/478 |
| 3,379,087 | 4/1968 | Weitzner | 84/478 |
| 3,482,480 | 12/1969 | Decker | 84/478 |
| 3,693,493 | 9/1972 | Schmoyer | 84/479 |
| 4,254,686 | 3/1981 | Leonard | 84/481 |
| 4,516,465 | 5/1985 | Kani | 84/478 |

*Primary Examiner*—Russell E. Adams
*Assistant Examiner*—Jae N. Noh

[57] ABSTRACT

A piano teaching aid having a panel designed to fit over the keys of an existing keyboard so that lights mounted on the panel having more than one color or shape may be located directly above the piano keys to be played. The lights have more than one color or shape in order to distinguish the hand which the user will use to play the piano. The panel also includes a finder window which displays an alphanumeric code which corresponds to a like code appearing next to the score of music to be played. A foot pedal advancing mechanism is used whereby the user can control the speed which the lights display the keys to be struck, using the Foot Pedal to advance one action. The display also can show the music to be played at a tempo set by the user automatically changing from action to action without using the pedal. The panel articulates so that it may be stretched in one or more places so that it can fit over various dimensions of keyboards without interfering with keys to be played.

24 Claims, 4 Drawing Sheets

PIANO TEACHING DEVICE AND METHOD

BACKGROUND OF THE INVENTION

1. Field of Invention

The invention relates to Piano teaching devices. More particularly the invention relates to piano teaching devices which utilize lights above the piano keyboard in conjunction with a liquid crystal display and book displaying music.

2. Prior Art

The following Patents are found in the prior art:

| INVENTOR | DATE ISSUED | U.S. Pat. No. |
|---|---|---|
| United States Patents | | |
| Grindinger, Gerard R. | 03/04/69 | 3,430,530 |
| Sanders, Sam | 11/17/87 | 4,706,536 |
| Kani, Hirofumi | 05/14/85 | 4,516,465 |
| Decker, Tom W. | 12/09/69 | 3,482,480 |
| Schmoyer, A. R. | 04/16/68 | 3,377,716 |
| Weitzner, D. M | 04/23/68 | 3,379,087 |

The prior art shows several devices utilizing lights and crystal displays for teaching piano. The majority of these are built into the keyboard and cannot be used with existing pianos. Those which do fit on top of a keyboard are standardized so as not to be adaptable to the wide range of keyboards or are mechanically complex to install.

The use of computer technology and control tapes with a sound or sight display accompanying lights on a keyboard has been shown in Decker. These lights have been shown accompanying organ footpedals as well as keyboards. Also, chords shown in conjunction with colored measures on a printed book utilizing two or more different colored lights on a keyboard have been shown in Grindinger, as have books and associated keyboards in Sanders. The use of liquid crystal or other displays showing music has been shown utilizing moving displays located above the keyboard of an existing piano in Kani with programmed music. The moving displays allow the user to move has hands with the music; however, the preferred embodiment would not easily allow the user to cross hands since the two displays, one for each hand, cannot pass.

The use of audio track with visual lights has also been disclosed in Schmoyer. Also shown in the prior art are lights associated with a metronome so as to allow the player to view the music played in sequence with the rhythm of the melody in Weitzner. This also discloses different colored keys for different octaves to be played. A display window is also disclosed which shows individual sequences of music corresponding to the lighted keys.

One of the major problems with prior art is the expense associated with these as well as not being attachable to existing equipment. Hence a new keyboard is necessary with each of the display means. Another problem is that different hands are not clearly indicated at all times. Another problems is the failure to carefully associate the visually displayed lights with sheet music which will ultimately be the sole guide to music.

Still another problem is the inability to utilize the invention with any of the multitude of existing piano keyboards of different sizes which include the Japanese, American and German styles of keyboards.

3. General Discussion of the Invention

The Piano Stick TM is designed as a teaching aid for existing pianos utilizing broadly defined concepts of lighted fingering displays. The Piano Stick TM allows a teacher or pupil to control with a pedal the movement through a song. The software provides two displays. One is a colored light display above the keys to be played. The other is an alpha numeric display in a LED window.

The software or process moving the student along includes an alpha numeric display of data on a display window provided with the Piano Stick TM which matches a corresponding alpha numeric display on a hard copy booklet accompanying the software data.

Because the Piano Stick TM fits on top of an existing piano, it is not necessary to purchase a separate piano to utilize the light technology. Also, it allows the user to select any piano of choice.

A novel method of articulation allows the Piano Stick TM to fit over any size piano keyboard. Since it fits over the keys of the piano, it is easy to view the keys to be struck.

Since it fits over the keyboard, it may be set in place and removed by a teacher utilizing the invention for different students.

The separate foot pedal control allows the teacher to control the speed of a pupil or allows the pupil to control his own speed.

From a standpoint of music education, the Piano Stick TM offers several advantages over conventional methods.

Hand "split", or the ability to indicate to the student what hand is to play what notes in an invaluable tool, particularly when teaching advanced techniques and arranging "tricks". Even with a previous manually lighted "keystrip" there was always the problem of indicating this split. The Piano Stick TM solves this problem by color-coding the right and left hands (green and red). This fundamental act greatly simplifies the teaching of rather complex techniques compared with older "keystrips" or live teaching. An alternate embodiment envisions the use of a third color light which would indicate the position of the thumb and small finger relative to the first key struck if either the thumb or small finger was not used.

The Manual Mode allows a player is stay on one action as long as desired. Coupled with the Finder Window this enables the player to scrutinize the printed page and build correlations between printed music and the physical feel and shape of the activating keyboard.

The ability of the Piano Stick TM to be "fast-forwarded" or "reversed" gives the player or student the opportunity to repeat passages over and over to gain proficiency.

The device enables a player to totally ignore written music or study theory and still play the piano. Simultaneously it also allows for in-depth study of the art form regardless of age or level and at a pace set only by the player.

The Piano Stick TM is totally portable and will fit almost any piano ever made since it is provided with a unique articulating frame which fits over the back portion of the piano keys.

The Automatic Mode allows the player to experience the composition in precise rhythm. The Tempo Control allows this player to fit the speed to individual taste or ability.

It is therefore an object of the invention to provide a piano overlay which may be placed on an existing piano and indicate keys to be played utilizing lighted displays.

It is a further object of the invention to provide a teaching tool for the piano which will fit most full size keyboards.

A further object of the invention is to provide a method or system for teaching piano comprising a lighted display, a finder window showing an alpha numeric display corresponding to an alpha numeric display on sheet music.

A further object of the invention is to provide a method for teaching the piano where the teacher or student may control the speed with which a lit display moves between actions in a section of music.

Other objects and advantages of the invention will become better understood hereinafter from a consideration of the specification with reference to the accompanying drawings forming part thereof, and in which like numerals correspond to parts throughout the several views of the invention.

BRIEF DESCRIPTION OF THE DRAWINGS

For a further understanding of the nature and objects of the present invention, reference should be had to the following detailed description taken in conjunction with the accompanying drawings in which like parts are given like reference numerals and wherein.

DETAILED DESCRITPION OF THE PREFERRED EMBODIMENT

Figure 1:
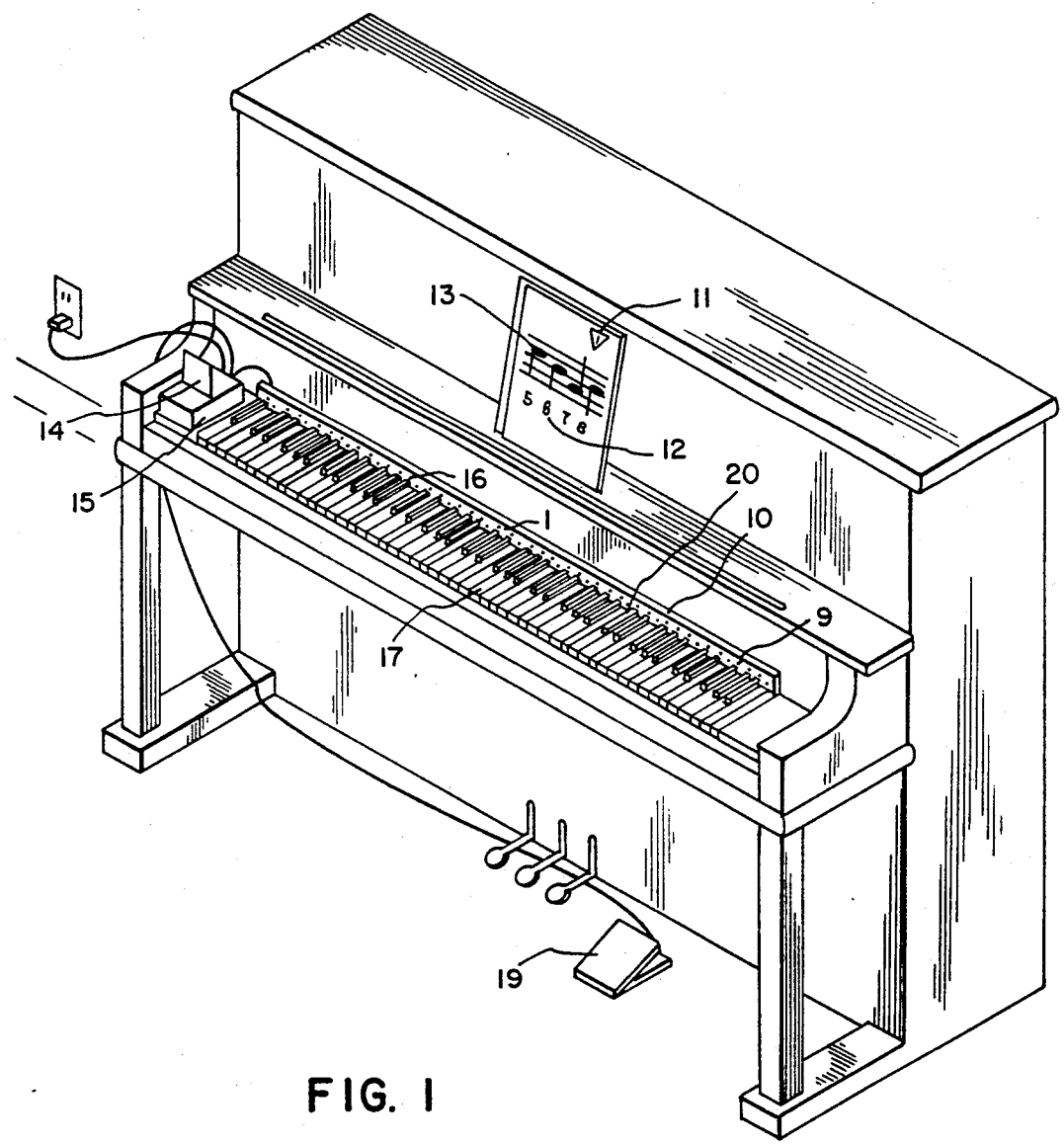
FIG. 1 is a perspective view of the Piano teaching device as it sits on a piano showing a separately attached data cartridge interface.

As can best be seen by reference to FIG. 1 the piano Stick TM 1 has a frame 16 which sits on the piano keys 17 and holds lights 9 which face the user. A detachable data cartridge interface 15 is also shown for receiving a data cartridge 14 which holds the data which the device uses for teaching as described in more detail below.

Figure 2:
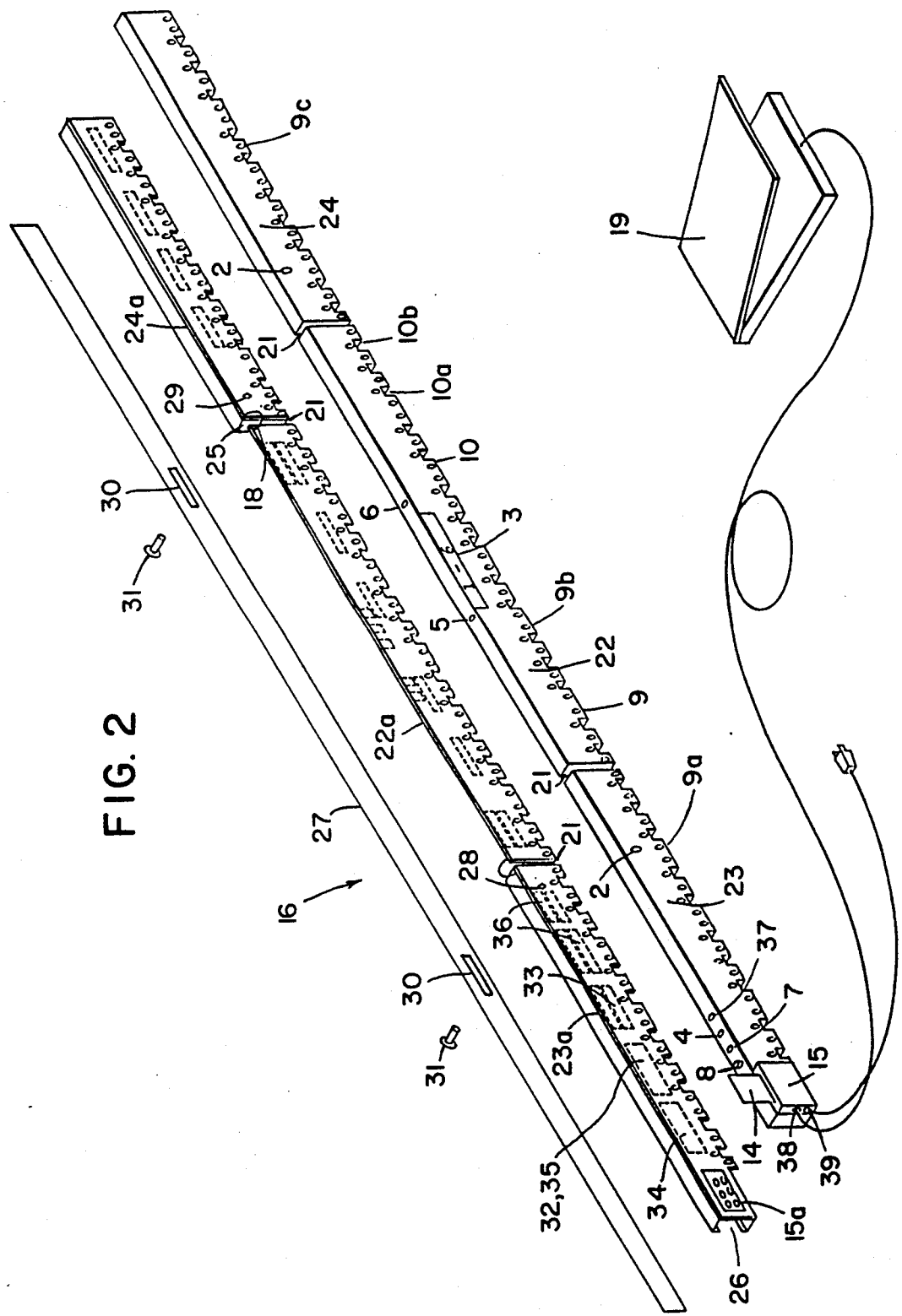
FIG. 2 is an exploded view of an alternate embodiment of the invention off of the piano where the data cartridge interface is attached to the frame.

As can best be seen by reference to FIG. 2, the piano Stick TM 1 may have the data cartridge interface 15 built into the frame 16. Here the data cartridge interface 15 plugs into the electrical circuit through plugs 15(a). The frame 16 has a panel 10 which faces the user. The panel 10 is in two parts. The front is a cover plates 22, 23 and 24 described in more detail below and the rear is a circuit board 22(a), 23(a) and 24(a) described in more detail below holding the wiring for the various electrical components discussed in more detail below.

The device utilizes output light means 9 which are, in the preferred embodiment, dual and single indicator LEDs 9. There are mounted on the panel 10 eighty seven dual indicator lights (LEDs) 9, which are merely dual color displays 9, to guide a player of a piano automatically.

The panel 10 defines indentions 10 (a) having sides 10(b) formed by the panel. These indentions 10(a) fit over the black piano keys 20, while lightly touching the back of the white piano keys 17. These indentions allow the lights to appear directly above the appropriate key.

The frame 16 is preferably ½ inch wide so that only the very rear portion of the piano keys are covered. In the preferred embodiment the frame 16 sits without any support but a velcro backing (not shown) may be added which would allow the frame 16 to be removably attached to the piano.

In the preferred embodiment of the piano stick, the panel 10 designed to fit over the keys 17, resting slightly above or on the white keys 17 and defining depressions or indentions 10(a) in the panel 10 into which the black keys 20 fit. The panel 10 is used for mounting displays 2, 3 and 9 in the preferred embodiment lights 2, 3 and 9, to assist playing pianos. One of the principle advantages of the invention is its ability to fit on almost any full size piano. On almost all pianos, assembly considerations result in small variations in the spacing of keys on the keyboard. At least one articulation 21 is provided so that position of the panel 10 or the frame 16 fitting on the keyboard may be slightly changed to adjust for the slight variation in keyboards.

Figure 4:
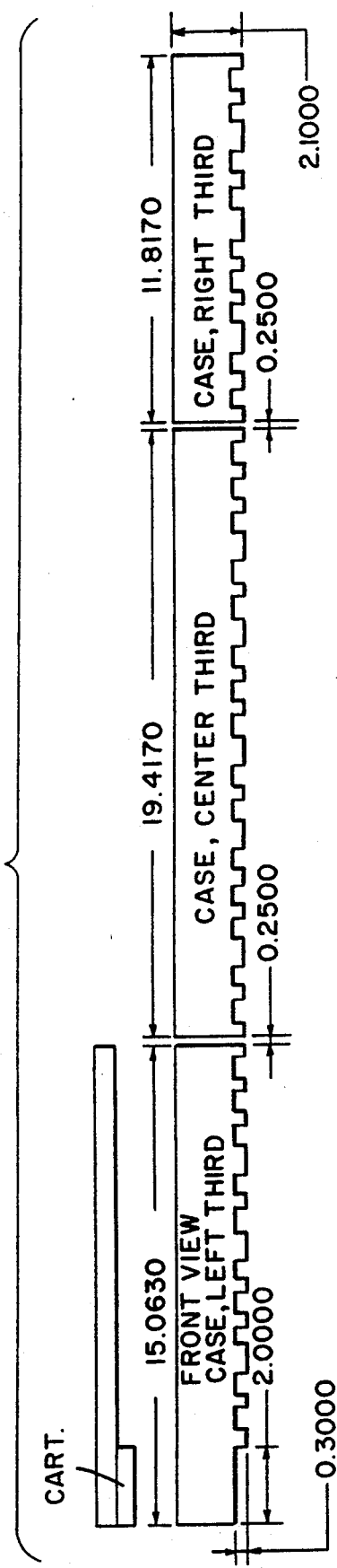
FIG. 4 is a detail engineering drawing showing the dimensions of the articulated segments of the panel of the invention shown in FIG. 3.

This improvement allows the piano stick to fit over the keys 17 of any piano. As seen in FIG. 4, in the preferred embodiment, the panel 10 is comprised of three separate members separated by articulations 21. This is because where ⅛ of the distance of a keyboard is unmatched, there is usually a slight encroachment of the panel 10 on the black keys 20 since most keyboards vary from the average alignment. As is obvious, the more articulations 21, the more adaptable the frame 16.

In the preferred embodiment, the panel 10 comprises a center plate 22; a left plate 23; a right plate 24; and a means for mounting and adjusting 21 (the articulation) attached to the center plate 22, the left plate 23 and the right plate 24 allowing the left plate 23 and the right plate 24 to be adjusted outward relative to the center plate 22. An integral part of plates 22, 23 and 24 are the circuit board backings which are shown as split off in FIG. 2 for clarity.

Behind center plate 22 is center circuit board 22(a), behind left plate 23 is left circuit board 23(a) and behind right plate 24 is right circuit board 24(a). All three circuit boards 22(a), 23(a) and 24(a) are electrically connected by, for example. flexible wires 18.

In the preferred embodiment, the means for mounting and adjusting 21 comprises a right groove 25 defined by said right plate 24; a left groove 26 defined by said left plate 23; a backplate 27 attached to center plate 22 and extending through grooves 26 of the left plate 23 and grooves 25 of the right plate 24; a nut 28 defined by said left plate 23; a nut 29 defined by said right plate 24; two slots 30 of approximately ¼ inch each defined by the backing said slots 30 beginning at the edge of said center plate 22 and extending outward and a bolt 31 extending through said slots 30 and within said nuts 28.

Figure 3:
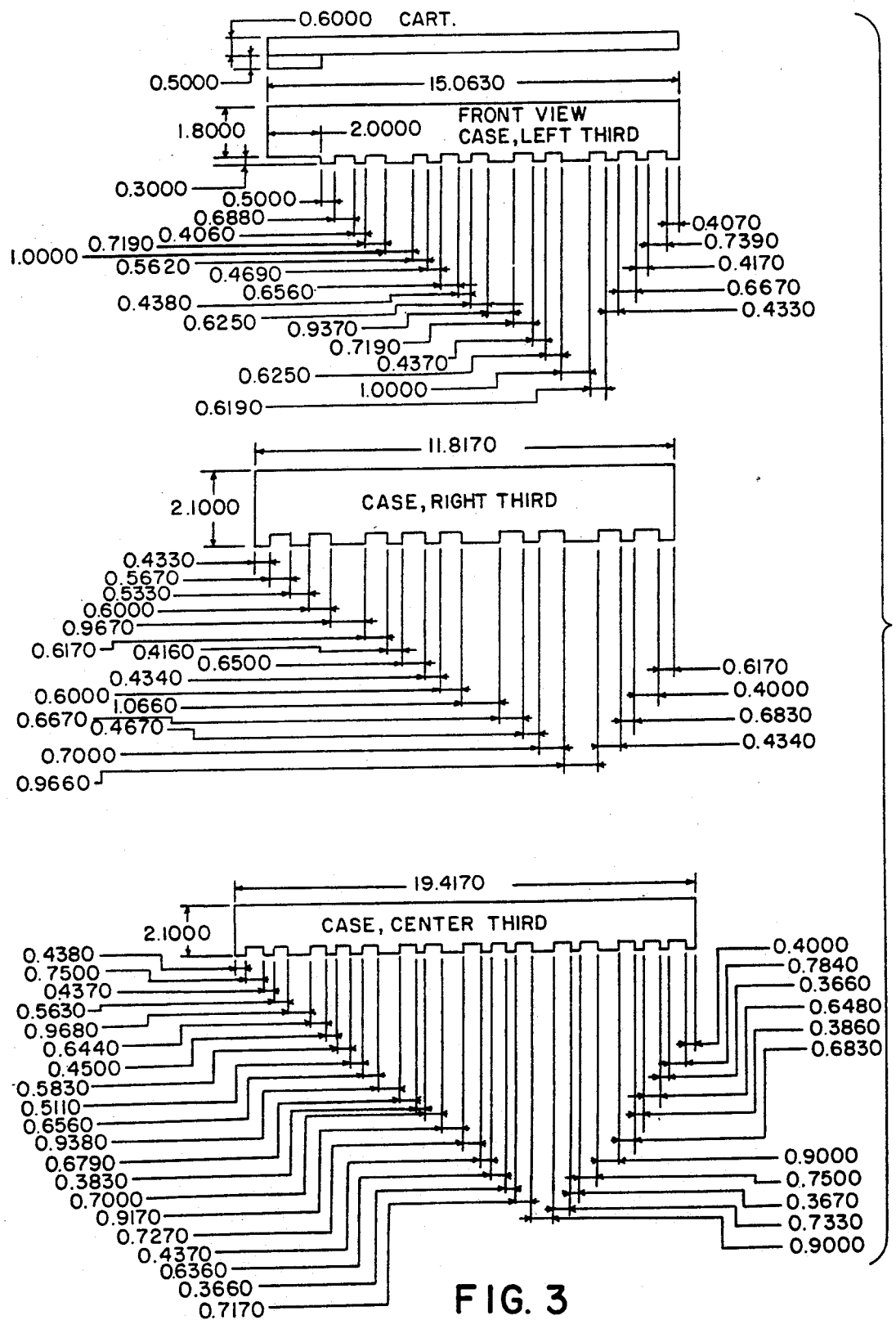
FIG. 3 is a view of the panel members showing the relative size of the indentions in the preferred embodiment.

In the preferred embodiment, the center plate 22 is approximately 19.417 inches long and 2.1 inches high. The individual indentations have widths as shown of FIG. 4. The left plate 22 is approximately 15.063 inches long and 2.1 inches high. The individual indentions are a shown in FIGS. 3 and 4. The right plate 23 is 11.817 inches long and 2.1 inches high.

The indentions 10(a) are approximately 0.3 inches deep.

Since the object of the articulation 21 is to allow for the variations of distances in narrow ranges, only ¼ inch being necessary between each plate, these articulations 21 are subject to a great deal of variation which would be obvious given the basic concept of articulation 21 set forth herein. Also, given wider indentations 10(a), less play would be necessary in the articulations 21 since there would be greater distance between the side walls 10(b) of the indentations defined by the panel 10.

In the preferred embodiment From Left to Right there are 25 all-red lights 9(a), 40 dual colored green and red lights 9(b) (also refered to as multiple ouptut light means, having more than one output) and 12 all green lights 9(c).

The red color indicates that the player is to utilize the left hand fingers in playing any keys indicated. A green color indicates the player is to use the Right Hand fingers.

In order to provide simplicity in reading and manufacture, the multicolored lights 9 are encompassed in single solid state LED 9 capable of displaying two colors. In an alternate embodiment, in order to allow the indicators to be used by color blind users two different shaped lights could be used. In this alternate embodiment, a round light could indicate one hand and a square light the other hand.

With dual color lights 9, a light 9 may be red on one sequence and green on the next.

One of the significant values of the Piano Stick TM 1 is its ability to indicate this hand identification throughout any composition or exercise. Such guidance by manual means has been found very difficult to accomplish.

An alternate embodiment would have a third shaped or colored indicator present is the LED 9. This may be accomplished without a great deal of additional cost or complicating the method. This third color would indicate the position of the thumb on one side and small finger on the other from the keys to be played which would allow the user to know the actual finger placement. In this embodiment, if the thumb was not used and the first finger was, then the light immediately adjacent to the key would light with the third color. If the thumb and first finger were not used, the two lights from the key to be played would be lit with the third color indicating that the thumb and first finger would not be used.

The use of the the piano Damper Pedal is indicated by signaling the player with two damper lights 2 of a different color, in the preferred embodiment yellow, than the ones used for the keys. Two damper lights 2, one on either side of the panel 10, are used so that one will always be in the peripheral vision of the player.

An LED alpha numeric display system called the "Finder Window" TM 3 comprises a finder window 3 coupled with small section numbers 11 and action numbers 12 on the printed music 13 so that at any point in the pre-recorded program the player can look at the "Window" numbers 11 and 12 and identify what is being played on the printed music 13 by the reference numbers 11 and 12 on the pages.

The music is fed into the piano stick 1 by way of a data source 14. The data source 14 feeds into the unit through a data cartridge interface 15 which interfaces the data source 14 with a central processing unit 16. The data source 14 contains data for the central processing units ROM program and the data is arranged in records which correspond with the numbered sections 11. Each record contains any number of datum which correspond with the "Actions" 12 which are the actual notes of the composition or exercise/example.

A program of 12 songs would contain 12 records corresponding to 12 "Sections." Within each Section there may range usually from 32 to 189 datum corresponding to 32 to 189 "Actions" 12 as a typical example. Of course, a song may have only one action 12 or may have as many actions 12 as are necessary to make the song complete.

This "Finder Window" 3 may be a liquid crystal display or an LED display and the finder window 3 allows the player to view where he or she is within the program and compare that to the action 12 shown in the music 13. In the preferred embodiment, the display is a seven segment LED display 3. This type of display 3 prevents the full use of the alphabet, but has advantages of a decrease in cost and provides an easily viewed diplay 3. As discussed in more detail below, the display 3 in the preferred embodiment is purely numeric. It may be alphanumeric without departing from the basic concepts discussed below.

Using other controls, described below, the player is able to jump from Section to Section. This "Finder Window" 3 is the indicator for any position within the program.

The finder Window is also used as an indicator for tempo under different conditions. The Finder Window is therefore a multi-purpose display unit.

Other controls on the Piano Stick TM allow control over the execution of the program on the PROM 33, an advancing means 19, a Foot Pedal 19 in the preferred embodiment. The foot pedal 19 is a dual purpose control. In Manual Mode of operation the Foot Pedal is used to advance the program one step at a time. Each time the pedal is tapped an "Action" 12 (some lighted display 9 on the panel 10) is advanced.

Used in conjunction with any one of the two forward 6 or back 5 controls, it is used to advance the program ahead or backward complete sections 11 at a time.

The Pedal 19 is also used to start and stop automatic operation in Automatic Mode, which is set using Auto Switch 7.

A Back Switch 5 is used to back up the data one musical measure for each time pushed.

When the Foot Pedal 19 is held down this same switch 20 is used to back up the data one Section at a time.

A Forward Switch 6 is used to advance the data one musical measure for each push.

This same switch 6 used while the Foot Pedal 19 is pushed down is used to advance the data one Section at a time.

An Automatic Switch 7 is used to select Manual-Automatic Mode. In Manual Mode the Foot Pedal 19 activates the program one Action at a time. Pushing the automatic switch 7 puts the machine in Automatic Mode. Built into the automatic switch 7 is an automatic switch light which indicates that the automatic switch is being used when the light is lit.

In Automatic Mode depressing the Foot Pedal 19 just once activates a metronome 37 shown) to guide the player. One measure of the metronome 37 is heard before the Action 12 starts and continues to sound during any phase of automatic operation. A light or other physical display may accompany the sound displayed metronome 37.

The activation of the metronome 37 also activates the rhythm-reading aspect of the computer based on a clock built into the CPU including notes and rests and automatically advances the display 2, 3 and 9 from action 12 to action 12 without utilizing the foot pedal 19.

In the automatic mode, the program continues to light the LEDs above the appropriate keys 17 in exact rhythm until the end of the Section 11 or until the player stops the action by tapping the Foot Pedal 19. The Pedal 19 can be used to re-start the program where it was stopped or the position in the program defined by section 11 and action 12 can be changed with the back switch 5 and forward switch 6.

Each Section 11 of a program has the default tempo set by the programming. However, this can be altered at any time. The Tempo Switch operates only when the action is stopped. Pushing the Tempo Switch 8 clears the Finder Window 3 and immediately displays the default tempo on the window 3.

By pushing the Back Switch 5 the tempo is reduced in segments of 10 from whatever the tempo number is, down to a minimum of 30 from a maximum of 120. Then it scrolls back to 120 and again begins a descent. Similarly, the Forward Switch 6 may allow movement of the tempo number in the opposite direction.

Whenever the desired number is reached the player again pushes the Tempo Switch 8 and the tempo is set at that speed and the Finder Window 3 again displays the program position numbers 11 & 12.

The central processing unit (32 shown) executes the program stored in the PROMs. The central processing unit 32 is activated by the application of power when the power switch 7 is turned to the "on" position.

As shown in FIG. 2, the electronics as a whole comprise a means for reading the data source and displaying the data on the dual color light display and finder window. This means for reading comprises generally a data interface cartridge 15 accessible from a central processing unit 32; a program prom 33 accessible from a central processing unit 32; a ram memory 34 for storing information during the operation of the program rom 33; an LED and display drive circuit 35 (built into the CPU 32 in the preferred embodiment) controllable from said central processing unit 32; a power supply 39 supplying power to the central processing unit 32; a select decoding circuit 36 allowing the central processing unit 32 to selectively control the circuit defined above; a pedal interface 38 for signaling changed conditions to the central processing unit 32; a series of displays or lights 2, 3 and 9, including the window 3 and the board lights 9 controlled by CPU 32 and the display drive circuit 35.

The basic controls are an On-Off switch 7, a Master Reset Button 4, and a metronome volume dial 37.

An alternate embodiment would include a switch for an added feature of semi-automatic control whereby the mere playing of an action 12 triggers the next action 12 without having to use the foot pedal.

The enclosure or frame 16 supports a Power in socket 38, a Foot Pedal in socket 39, a data cartridge socket 15, a standard 5 pin MIDI out socket (not shown), and a side socket for attaching a matching speech module (not shown) (audio cassette [micro] player and speaker). The MIDI socket allows for the information coming from the data stream to be sent to an electric piano which would have a "MIDI in" socket. The electric piano with such a MIDI in socket would then play the music.

The device may have a standard UL Approved DC filtered and protected power supply or may have a battery supply (not shown).

Assembled, the panel 10 sits on top of the block on the left side of the keyboard or on top of the piano. A long wire is plugged into the socket on the piano stick marked with the "arrow" symbol and then into the Foot Pedal. A power wire from the Power Supply into the socket on the Piano Stick is marked with a "lightning bolt" symbol.

The Data Cartridge 14 is the computer memory card that contains the data for program. The program is locate on a PROM chip built into the internal circuit board. Alternatively, the entire program and data could be built into the data cartridge 14.

To use the device when set up the Data Cartridge 14 is plugged into the cartridge socket 15.

The Foot Pedal 14 is placed beneath the piano left of the other piano controls if the user is going to us it or to one side, if used by a teacher.

As indicated above, for example, if there are three red lights 9, this means to strike all three keys 17 at the same time with the left hand.

The green lights 9 above the keys 17 mean to use the right hand.

As indicated above, for example, if one green light 9 is lit, it means to strike the key 17 below that light 9 with the right hand.

Usually this part is called the melody.

If the lights 9 are green and red in the example given above simultaneously, it means to play the three indicated keys 17 with the left hand and the one key 17 indicated by the green light 9 with the right hand, all at the same time.

To start or move between actions, the user need only tap the foot pedal 19 with his left foot. After playing the appropriate action, a subsequent tap moves the song forward lighting up what other lights 9 are necessary to continue playing.

When a song is over nothing will light the last time the pedal 19 is pushed. To play it again the user pushes the Foot Pedal 19 and the Backup Switch 5 at the same time and the Foot Pedal 19 moves back one section or song. If the user wants to go more than one action at a time, the Back 5 and Ahead 6 switches do just that.

The user can advance a measure if the user pushes the Ahead switch 6 without the foot pedal 19. The Back switch 5 does the opposite, reversing one measure at a time without the foot pedal 19.

The right pedal on a piano (or an electronic instrument) is called the Damper Pedal. When this is pushed down with the right foot any keys struck will continue to sound until the string ceases to vibrate or until a programmed voice dies away (or continues to sustain). On a piano, felt dampers (muting devices) are pulled away from the strings when a key is struck. The dampers return and stop the string from vibrating when the key is released. The Damper Pedal pulls all the dampers away from the strings and holds them there until you release the pedal.

The two damper lights 2 on either side of the Finder Window 3 dictate when the damper pedals are to be held. When these lights 2 are lighted this means to push the Damper pedal down and hold it until the lights go out.

The Finder Window 3 lets the user know where the user is in the data stream and on the musical score 13 on the hard copy music 13 at all times.

In every playing song in the hard copy music book 13 pale blue numbers 12 corresponding to the software data can be found under the notes 13. These are there to enable the user to find where the user is in the music and to identify what is being played.

The Finder Window 3 serves more than one purpose but the main function is to tell the user where the user in the music.

The first number 11 tells you what section the user is in.

The section number 11 is followed by a dash (—) which is followed by the action number 12, corresponding to the light blue numbers 12 on the score 13.

The automatic control 7 is used for Automatic operation. When it is pushed a light indicates Automatic Mode.

When Auto is "ON", a tap of the Foot Pedal 19 activates the Metronome, the speed guide or "Beat".

In Auto, the user does not have to tap the Foot Pedal 19 again. The central processor 32 is now reading the rhythm parameters of the song and moves from action to action automatically. The play can be stopped at any time by tapping the Foot Pedal 19 once. Tapping the Foot Pedal 19 again restarts the action.

The tempo is set in the preferred embodiment with the action stopped by pushing the Tempo Switch 8. The preset tempo number will appear in the Finder Window 3; next, by tapping the Back Switch 5 the tempo numbers in the window 3 scroll backward (Example: 90-80-70). If the count goes below 30 it jumps to 120 and then starts backwards again.

If the Tempo Switch is pushed once more, the tempo is set and the tempo numbers disappear, to be replaced by the section 11 and action 12 numbers.

Because many varying and different embodiments may be made within the scope of the inventive concept herein taught and because many modifications may be made in the embodiment(s) herein detailed in accordance with the descriptive requirements of the law, it is to be understood that the details herein are to be interpreted as illustrative and not in a limiting sense.

I claim:

1. A piano teaching device for use on a piano having keys comprising;
   a) a frame;
   b) at least one multiple output light means capable of displaying either of two different displays over a single key depending on data received from a data source mounted on said frame so that when the frame is in place the multiple output light means is situated over said single key;
   c) a data source electronically connection to the frame supplying data;
   d) a means for reading the data source data and displaying the data on the multiple output light means electronically connected to said panel;
   e) an advancing means electronically connected to said panel.

2. The teaching device of claim 1 wherein the frame fits over the raised piano keys and rests lightly on the unraised piano keys.

3. The teaching device of claim 1 wherein the multiple output light means is at least a two-color display.

4. The teaching device of claim 1 wherein the multiple output light means is at least a two shape display.

5. The teaching device of claim 3 wherein the multiple output light means is at least a three color display.

6. The teaching device of claim 4 wherein the multiple output light means is at least a three shape display.

7. The teaching device of claim 1 wherein the multiple output light means includes a finder window.

8. The teaching device of claim 1 wherein the multiple output light means includes a damper pedal light.

9. The teaching device of claim 1 wherein the data source comprises;
   a) an alpha-numeric display record capable of being displayed as a section and action number;
   b) a data record capable of indicating which multiple output light means is to be lighted.

10. The teaching device of claim 9 further comprising;
    a) a finder window for displaying the alphanumeric display.

11. The teaching device of claim 10 further comprising;
    a) a book having musical scores arranged in sections and displaying action reference numbers below the scores corresponding to the alphanumeric display.

12. The teaching device of claim 11 wherein the reference numbers are a different color from the musical scores.

13. The teaching device of claim 10 wherein the action reference numbers are a different shape from the numbers in the musical scores.

14. The teaching device of claim 2 wherein the frame further comprises at least two plates separated by an articulation and wherein at least one of the plates has at least one multiple output light means and wherein the other plate has at least one output light means.

15. The teaching device of claim 14 wherein the frame further comprises;
    (d) a means for mounting and adjusting one plate relative to the other.

16. The teaching device of claim 14 wherein the frame further comprises a second so that the frame comprises;
    a center plate holding at least one output light means connected at the right side to the first articulation and at the left side to the second articulation;
    b) a left plate holding at least one output light means said left plate having a left and right side and said left plate being connected at its right side to the first articulation;
    c) a right plate holding at least one output light means said right plate having a left and right side and said right plate being connected at its left side to the second articulation;

17. The teaching device of claim 16 wherein the frame further comprises:
    d) a means for mounting and adjusting attached to the center plate, the left plate and the right plate allowing the left plate and the right plate to be adjusted outward relative to the center plate.

18. The invention of claim 17 wherein the means for mounting and adjusting further comprises;
    a) a backing attached to said center plate and extending outward from said center plate;
    b) a right groove defined by said right plate for receiving one end of said backing;
    c) a left groove defined by said left plate for receiving one end of said backing;

19. The invention of claim 17 wherein the means for mounting and adjusting further comprises;
    a) a nut defined by said left plate;
    b) a nut defined by said right plate;
    c) at least two slots defined by the backing said slots beginning at the edge of said center plate and extending outward; and
    d) a bolt extending through said slots and within said nuts.

20. The invention of claim 19 where at least one of the slots is greater than ⅜ inch long.

21. The invention of claim 1 further comprising;
a) a means for controlling tempo;
b) a means for automatic sequencing of data.
c) a means for back sequencing of data.

22. The invention of claim 21 further comprising:
c) a means for back sequencing of data.

23. The invention of claim 1 wherein the means for reading the data source and displaying the data comprises;
a) a data interface cartridge accessible from a central processing unit;
b) a central processing unit for controlling the flow of data;
c) a display drive circuit controllable from said central processing unit;
d) a power supply supplying power to the central processing unit;
e) a pedal interface for signaling changed conditions to the central processing unit,
f) a dual color light display;
g) a finder window.

24. A frame for mounting displays to assist playing pianos and a book designed to fit over any piano comprising a panel defining spaces for the raised, usually black keys, and further comprising an output means over at least one of said keys and panel, which panel and further comprising an adjusting means allowing the adjustment of the distance between the articulations as to allow the panel to fit over keyboards having black keys of varied spacing, and further comprising a finder window connected to the panel so that it may be viewed by the user and display an alphanumeric number, and said book has numbers which corresponds to the alpha numeric display of the finder winder associated with the particular actions of the score of music to be played.

* * * * *